United States Patent [19]

Tani et al.

[11] Patent Number: 5,760,840
[45] Date of Patent: Jun. 2, 1998

[54] APPARATUS FOR DISTINGUISHING BETWEEN A PLURALITY OF VIDEO SIGNAL TYPES, APPARATUS FOR AUTOMATIC ASPECT RATIO DETERMINATION AND TELEVISION RECEIVER

[75] Inventors: Masahiro Tani, Daitou; Naoji Okumura, Minou; Atsuhisa Kageyama, Ibaraki, all of Japan

[73] Assignee: Matsushita Electric Industrial Co., Ltd., Osaka, Japan

[21] Appl. No.: 414,710

[22] Filed: Mar. 31, 1995

[30] Foreign Application Priority Data

Mar. 31, 1994 [JP] Japan .................................. 6-062618
Jul. 18, 1994 [JP] Japan .................................. 6-165203

[51] Int. Cl.$^6$ .................................. H04N 5/46; H04N 5/21
[52] U.S. Cl. .................................. 348/558; 348/630; 348/631; 348/672
[58] Field of Search .................................. 348/558, 625, 348/630, 631, 672; H04N 5/46, 5/21, 5/14

[56] References Cited

U.S. PATENT DOCUMENTS 4,656,665  4/1987  Pennebaker .................................. 348/625
5,239,378  8/1993  Tsuji .................................. 348/625

FOREIGN PATENT DOCUMENTS 0 546 880   6/1993   European Pat. Off. .
6-49617     3/1994   Japan .
6-225241    8/1994   Japan .
WO 91/19390 12/1991  WIPO .

OTHER PUBLICATIONS

European Search Report dated May 9, 1996.

*Primary Examiner*—Sherrie Hsia
*Attorney, Agent, or Firm*—Ratner & Prestia

[57] ABSTRACT

An automatic aspect ratio discrimination apparatus for detecting a picture starting position, a picture ending position and a subtitle ending position by generating three histograms segmented by two slice levels S and T at every line from a luminance signal Y at a comparison circuit and counters, judging when the line is black, a picture or a subtitle by inputting the obtained histograms to the comparison circuit, detecting lines varying from black to picture, from picture to black, and from subtitle to black at an edge detection circuit and judging if the lines varying from black to picture and from picture to black are stable in time or not at a temporal filter.

16 Claims, 19 Drawing Sheets

| line | CP1 | CP2 | CP3 | encode data |
|---|---|---|---|---|
| black | 1 | 0 | 0 | 00 |
| picture | 0 | 1 | 0 | 01 |
| subtitle | 0 | 0 | 1 | 10 |

APPARATUS FOR DISTINGUISHING BETWEEN A PLURALITY OF VIDEO SIGNAL TYPES, APPARATUS FOR AUTOMATIC ASPECT RATIO DETERMINATION AND TELEVISION RECEIVER

BACKGROUND OF THE INVENTION (1) Field of the Invention

The present invention relates to an apparatus for discriminating video kinds of the information included in a video signal inputted to a television receiver or a video signal outputted from a recording medias such as a video tape recorder and to an automatic aspect ratio discrimination apparatus for automatically discriminating an aspect ratio from the video signal and further to a television receiver which can automatically display an optimum picture corresponding to the inputted video signal by assembling the automatic aspect ratio discrimination apparatus in the receiver.

(2) Description of the Prior Art

Recently, display apparatus having a 16:9 aspect ratio such as wide television receivers and HighVision television receivers are being widely spread. To effectively utilize the display apparatus with a 16:9 aspect ratio, it is necessary to discriminate an aspect ratio of the video signal and select a display area. Therefore, aspect ratio discrimination apparatus to select a suitable display area are important.

An aspect ratio discrimination apparatus in accordance with the prior art is shown in FIG. 1. A remote controller 17 stores the aspect ratio judged by a viewer and sends the information to a micro computer 18. The micro computer 18 outputs signals of a picture starting position and vertical expansion factor according to the information transmitted from the remote controller 17.

The performance of an aspect ratio discrimination apparatus shown in FIG. 1 is explained referring to FIGS. 2(a) and 2(b).

The viewer judges which aspect ratio the video signal has, 4:3 (ordinary), 5:3 (cinema) or 16:9 (wide), watching the picture displayed on the screen. When the signal is a cinema signal, the picture is vertically expanded as shown in FIG. 2(a) by pressing a button of the remote controller 17 called cinema button and transmitting a control signal to the micro computer 18. When the signal is a wide picture, the picture is vertically expanded as shown in FIG. 2(b) by pressing a button of the remote controller 17 called wide button and transmitting a control signal to the micro computer 18, similarly to a cinema signal.

In the above-described configuration, however, the viewer has to judge the aspect ratio by him/herself and there is a problem that the manipulation of the receivers is troublesome.

To solve the above-mentioned problem, the present invention offers an automatic aspect ratio discrimination apparatus which improves viewer manipulation by automatically discriminating the aspect ratio in the television receivers.

SUMMARY OF THE INVENTION

The present invention offers an aspect ratio discrimination apparatus including histogram generator means detecting a luminance signal level sampling an inputted video signal at every first designated period and for generating histograms showing each brightness level frequency distribution; comparison means for classifying each brightness level frequency distribution at every second designated period to plural kinds of video signals to compare the histogram forms at every second designated period such as at every scanning line of the output of the histogram generator means; edge detection means for detecting a variation point of the video kinds such as from a black to a picture from the output of the comparison means; counter for generating a timing signal for determining relation between the variation point to a different kind of video signal detected by the edge detection means and the time position of the inputted video signal; and temporal filter for generating a position signal of the video signal having the first variation point previously mentioned when a period until an instance when the second variation is detected which is the next video kind variation lasts for a designated period after the first variation of the video kind of the edge detection means is detected; and wherein a signal giving the time positions of video kind of the information included in the input video signal, the variation point of the video kind and the input video signal of the variation point from the output of the temporal filter.

Further, the present invention offers an aspect ratio discrimination apparatus providing means automatically finding the ratio of a picture area occupied in a displayed ares during a frame or a field period from the output of the apparatus discriminating video kind and an aspect ratio of the video signal from the position of the variation point of the video kind.

Still further, the present invention offers a television receiver automatically displaying an optimum picture corresponding to the information of the input video signal such as aspect ratio conversion, vertical position movement and subtitle moving for displaying a picture on display means such as a CRT and a liquid chrystal display device according to the output of the assembled automatic aspect ratio discrimination apparatus, being assembled with an automatic aspect ratio discrimination apparatusthe.

In the present invention, according to the configuration mentioned above, luminance signal levels of the input video signal are formed into a histogram during a designated period such as at every one line and kind of information included in the input video signal is obtained from the form (shape) of this histogram. A plurality of this kind of classification is set as kinds of video signals and the histogram obtained from the input video signal is classified to any one of these kinds. Because the kinds of video signals are classified so that what aspect ratio the information transmitted by an input video signal can be discriminated, the aspect ratio can be automatically obtained from the variation point.

In practical, which the line is a black, a picture or a subtitle is judged as a video kind by that three histograms segmented by slice levels S and T at every one line from the luminance signal are generated and the obtained histograms are inputted to a comparison circuit and a line varying from a black to a picture, from a picture to a black and from a subtitle to a black is detected at the edge detecting circuit and a picture starting position, a picture ending position and a subtitle ending position can be detected by judging if the line varying from a black to a picture, from a picture to a black and from a subtitle to a black is stable or not at the temporal filter. Thus, an optimum picture display is possible by obtaining an aspect ratio of the picture and expanding and displaying according to the aspect ratio of the displayed picture of the display means.

DETAILED DESCRIPTION OF THE INVENTION (First exemplary embodiment)

The performance of an automatic aspect ratio discrimination apparatus in accordance with a first exemplary embodiment of the present invention is explained below, referring to FIGS. 3 to 7.

Figure 3:
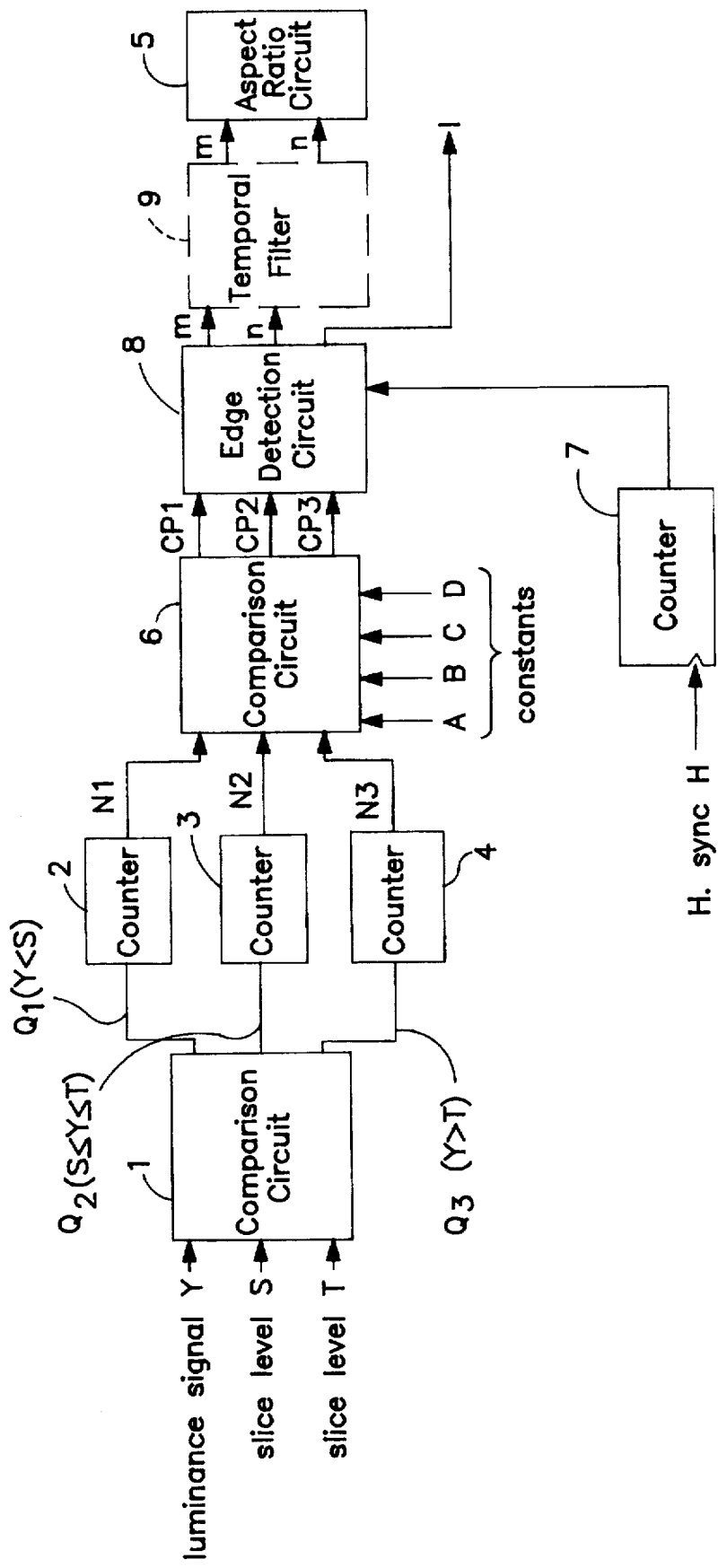
FIG. 3 is a block diagram of an automatic aspect ratio discrimination apparatus in accordance with a first exemplary embodiment of the present invention.

A block diagram of an automatic aspect ratio discrimination apparatus in accordance with a first exemplary embodiment of the present invention is shown in FIG. 3. A comparison circuit 1 outputs a signal Q1 indicating Y<S in the case in which a luminance signal Y is smaller than a slice level S, outputs a signal Q3 indicating Y>T in the case in which the luminance signal Y is larger than a slice level T and outputs a signal Q2 indicating S<=Y<=T in the other cases. Here, for example, a black level of a picture signal is set for the slice level S and a white level of the picture signal is set for the slice level T. Counters 2, 3 and 4 count signals Q1, Q2 and Q3, respectively.

A comparison circuit 6 sets the signal CP1 to a level H in the case in which the output N1 of the counter 2 is larger than a constant A, sets the signal CP3 to a level H (H means high) in the case in which the output N1 of the counter 2 is larger than a constant B, the output N2 of the counter 3 is smaller than a constant C and the output N3 of the counter 4 is larger than a constant D and sets the signal CP2 to a level H in the other cases.

When the total number of the sampled points of the luminance signal is 256, for example, the constants A, B, C and D are set to the values 250, 128, 100 and 5, respectively.

A counter 7 counts the number of horizontal sync signal as a clock input, from zero at every field.

An edge detection circuit 8 watches three output levels of the comparison circuit 6 and outputs an output of the counter 7 as a signal m in the case in which a signal outputted as a level H varies from the signal CP1 to the signal CP2, outputs an output of the counter 7 as a signal n in the case in which a signal outputted as a level H varies from the signal CP2 to the signal CP1, and outputs an output of the counter 7 as a signal l in the case in which a signal outputted as a level H varies from the signal CP3 to the signal CP1. For example, the values 58, 226 and 240 are outputted for the signals m, n and l, respectively.

The block 9 is a temporal filter and outputs the signals m and n as signals M and N, respectively as they are in the case in which the signals m and n do not vary longer than a designated period and outputs the value signals m' and n' held inside the temporal filter 9 as signals M and N, respectively, independent of the input value in the other cases.

The performance of an automatic aspect ratio discrimination apparatus in accordance with the first exemplary embodiment of the present invention is explained below, referring FIGS. 4(a) to 7.

Figure 4A:
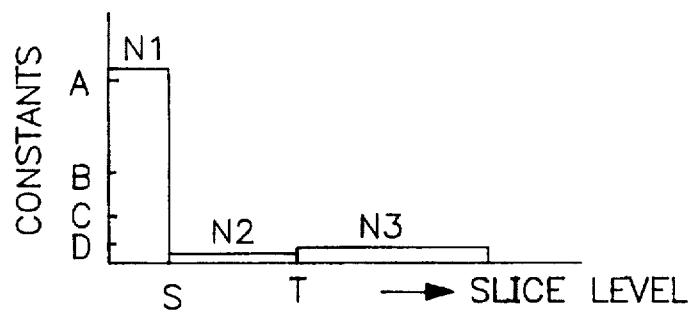
FIG. 4(a) illustrates a black histogram.

The input luminance signal Y is classified into Y<S, S<=Y<=T and Y>T according to the signal level at the comparison circuit 1. The counters 2, 3 and 4 accumulate each output at every line and make three histograms shown in FIGS. 4(a)–4(c). The histograms made at the counters 2, 3 and 4 are classified into three categories, a black histogram CP1, a picture histogram CP2 and a subtitle histogram CP3. That is, when the luminance signal Y during one line period concentrates to a black level, the distribution concentrates to the level between 0 and S (Y<S) and a histogram CP1 as shown in FIG. 4(a) is made.

Figure 4B:
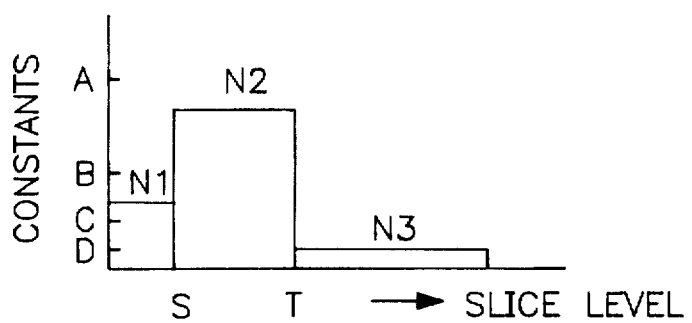
FIG. 4(b) illustrates a picture histogram.

When the luminance signal Y is an ordinary picture signal, it distributes in three categories of luminance level, that is, a luminance level between zero and S (Y<S), a luminance level between S and T (S<=Y<=T) and a luminance level higher than T (Y>T) and a histogram CP2 as shown in FIG. 4(b) is made.

Figure 4C:
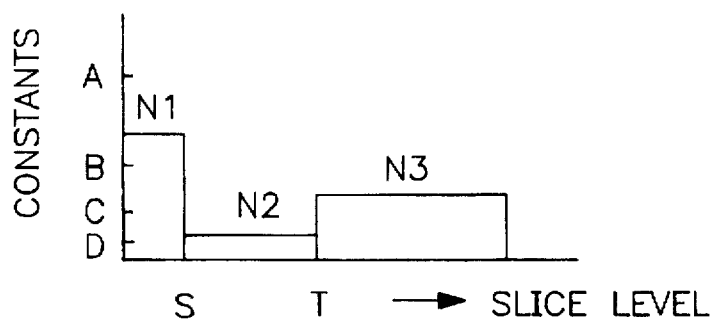
FIG. 4(c) illustrates a subtitle histogram.

When the luminance signal Y during one line period concentrates to a black level and a white level, the distribution concentrates to the luminance level lower than S (Y<S) and the luminance level higher than T (Y>T) and a histogram CP3 as shown in FIG. 4(c) is made.

Utilizing the classified data, a signal m indicating a picture top position E (calld line m, hereafter) of a letter box signal is obtained by outputting the value from the counter 7 when the luminance level distribution varies from a black histogram CP1 to a picture histogram CP2.

A signal n indicating a picture bottom position F (calld line n, hereafter) of the letter box signal is obtained by outputting the value from the counter 7 when the luminance level distribution varies from a picture histogram CP2 to a black histogram CP1.

Figure 5A:
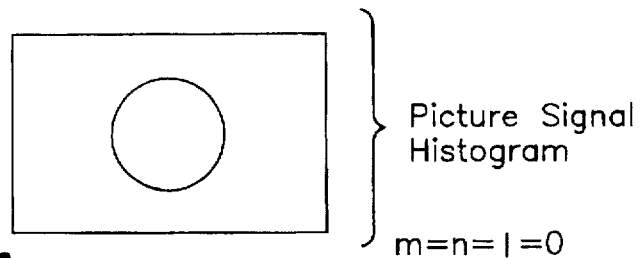
FIG. 5(a) illustrates displayed pictures for a video signal with a format of a 4:3 aspect ratio.
Figure 5B:
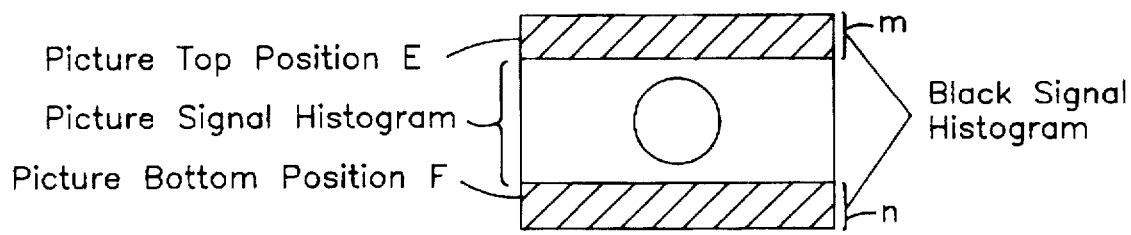
FIG. 5(b) illustrates displayed pictures for a video signal with a letter box format (without a subtitle).
Figure 5C:
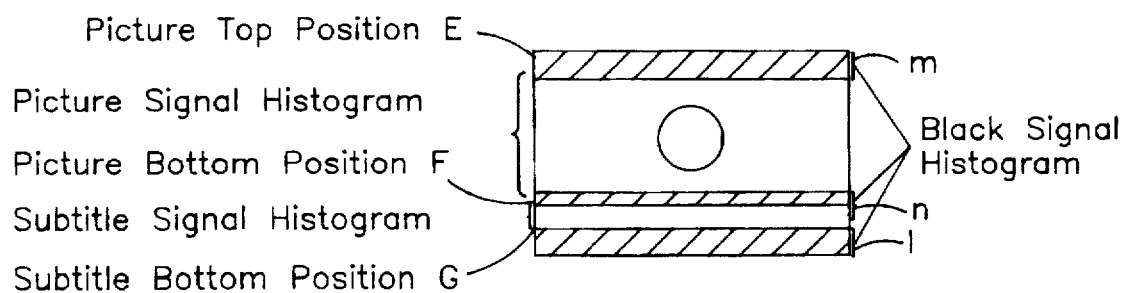
FIG. 5(c) illustrates displayed pictures for a video signal with a letter box format (with a subtitle).

A signal l indicating a subtitle bottom position G (calld line 1, hereafter) of the letter box signal is obtained by outputting the value from the counter 7 when the luminance level distribution varies from a subtitle histogram CP3 to a black histogram CP1. These data are detected at the edge detection circuit 8 as shown in FIGS. 5(a)–(c).

Figure 6:
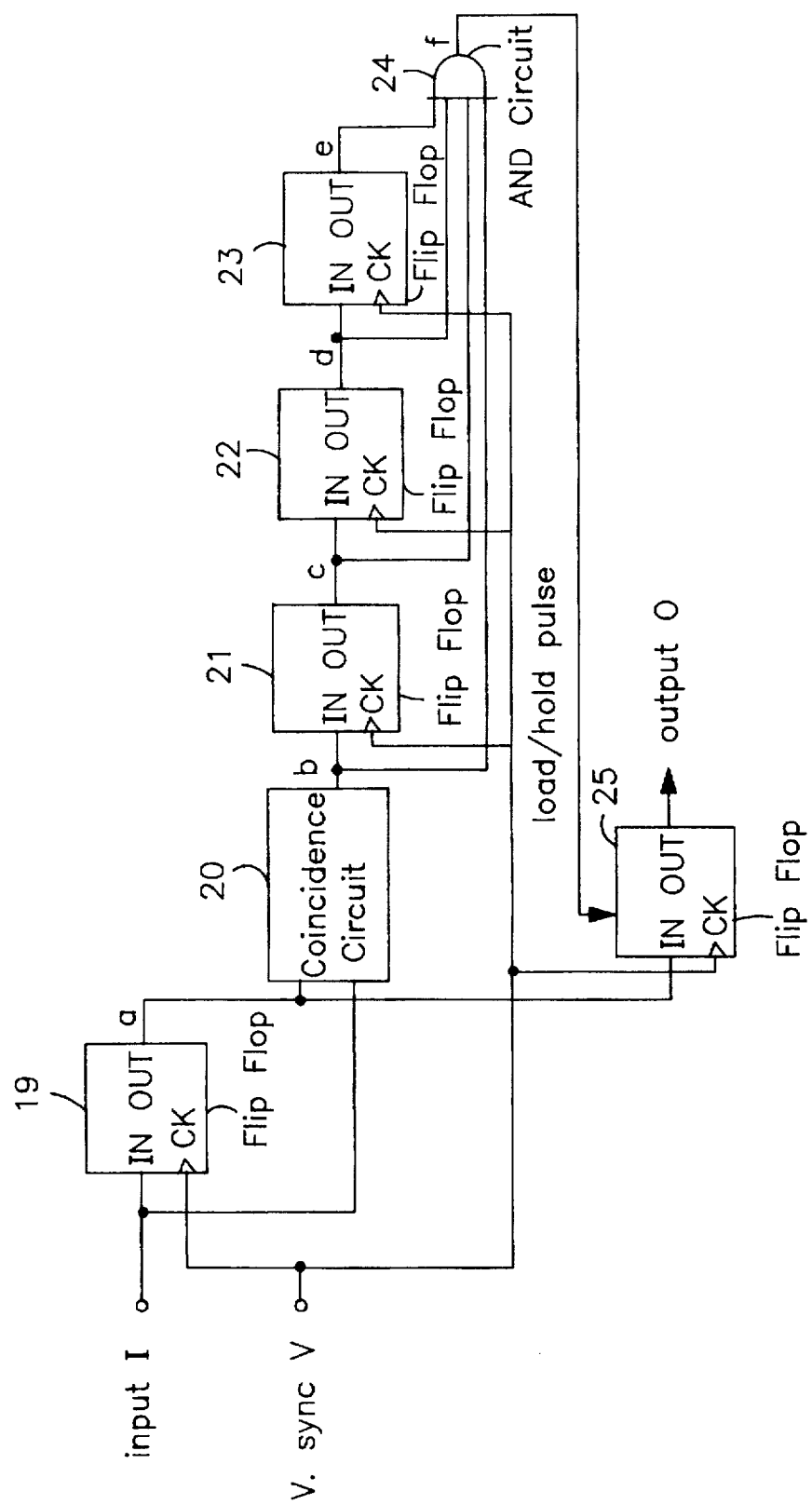
FIG. 6 is a block diagram of a temporal filter used in an automatic aspect ratio discrimination apparatus in accordance with the first exemplary embodiment of the present invention.

The detected lines m and n are inputted to the temporal filter 9. FIG. 6 shows an exemplary embodiment of a temporal filter 9. The input signal I is an example of the line m and the line n and is latched at a flip-flop 19 at every field. A coincidence detection circuit 20 compares the input signal I and the output signal of the flip-flop 19. When these signals are coincident, the level H (H means high) is outputted and when they are not coincident, the level L (L means low) is outputted. Flop-flops 21, 22 and 23 delay the output of the coincidence detection circuit 20 by one field, two fields and three fields, respectively.

An AND circuit 24 outputs an AND data of the output of the coincidence detection circuit 20 and the outputs of the flip-flops 21, 22 and 23. Only when all the outputs have a level H, the output of the AND circuit 24 has a level H. The output of the AND circuit 24 becomes a load/hold pulse of a flip-flop 25 and only when the output of the AND circuit 24 is a level H, the output of the flip-flop 19 is latched at the flip-flop 25.

Figure 7:
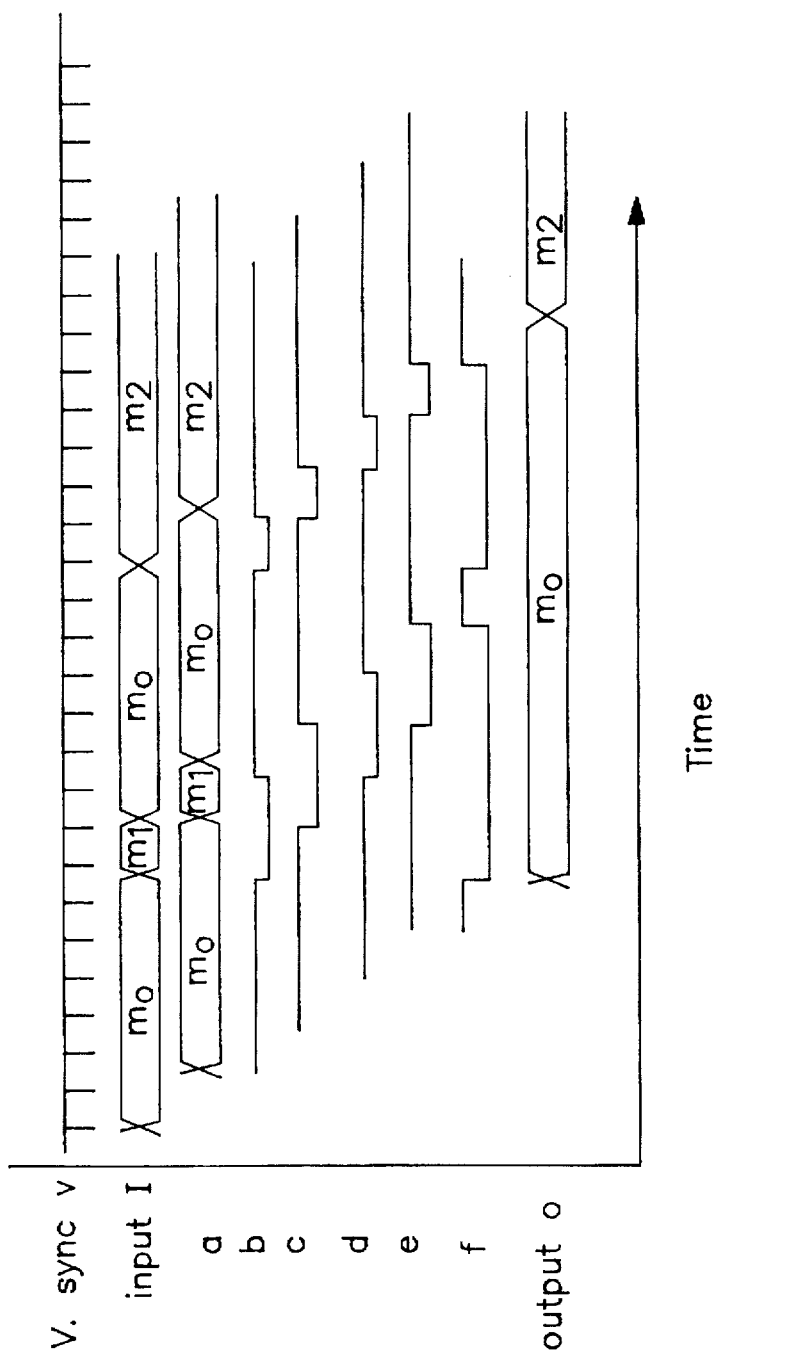
FIG. 7 is timing charts of a time filter used in an automatic aspect ratio discrimination apparatus in accordance with the first exemplary embodiment of the present invention.

FIG. 7 is a timing chart of the temporal filter 9 shown in FIG. 6. The temporal filter 9 is a temporal filter for five fields and the output O varies only when all the input data I are the same during five continuous fields.

Thus, discrimination of the video kind is finished, it is recognized that the signal is a letter box signal and the position data and the size data of the picture part can be obtained.

The aspect ratio is determined by aspect ratio circuit 5 using signals m and n and comparing the histograms to predetermined values. The picture starting position of a vertically expanded picture and the vertical magnification factor (220/(m−n)) at an ordinary picture display range with 220 lines can be calculated by detecting a picture top position E and a picture bottom position F of the letter box signal using signals m and n, respectively. For example, when the picture top position m is on the 58-th line and the picture bottom position n is on the 226-th line, the picture starting position at a vertically expanded picture is on the 58-th line and the vertical magnification factor is $$220/(226-58)=1.31,$$

where E and F indicate geometrical positions, m and n indicate electrical positions, that is on which number of the scanning lines the position is.

(Second exemplary embodiment)

An automatic aspect ratio discrimination apparatus in accordance with a second exemplary embodiment of the present invention is explained below, referring to FIG. 8.

The second exemplary embodiment aims to enhance the detection accuracy of the picture top position E, the picture bottom position F and the subtitle bottom position G of a letter box signal.

Figure 8:
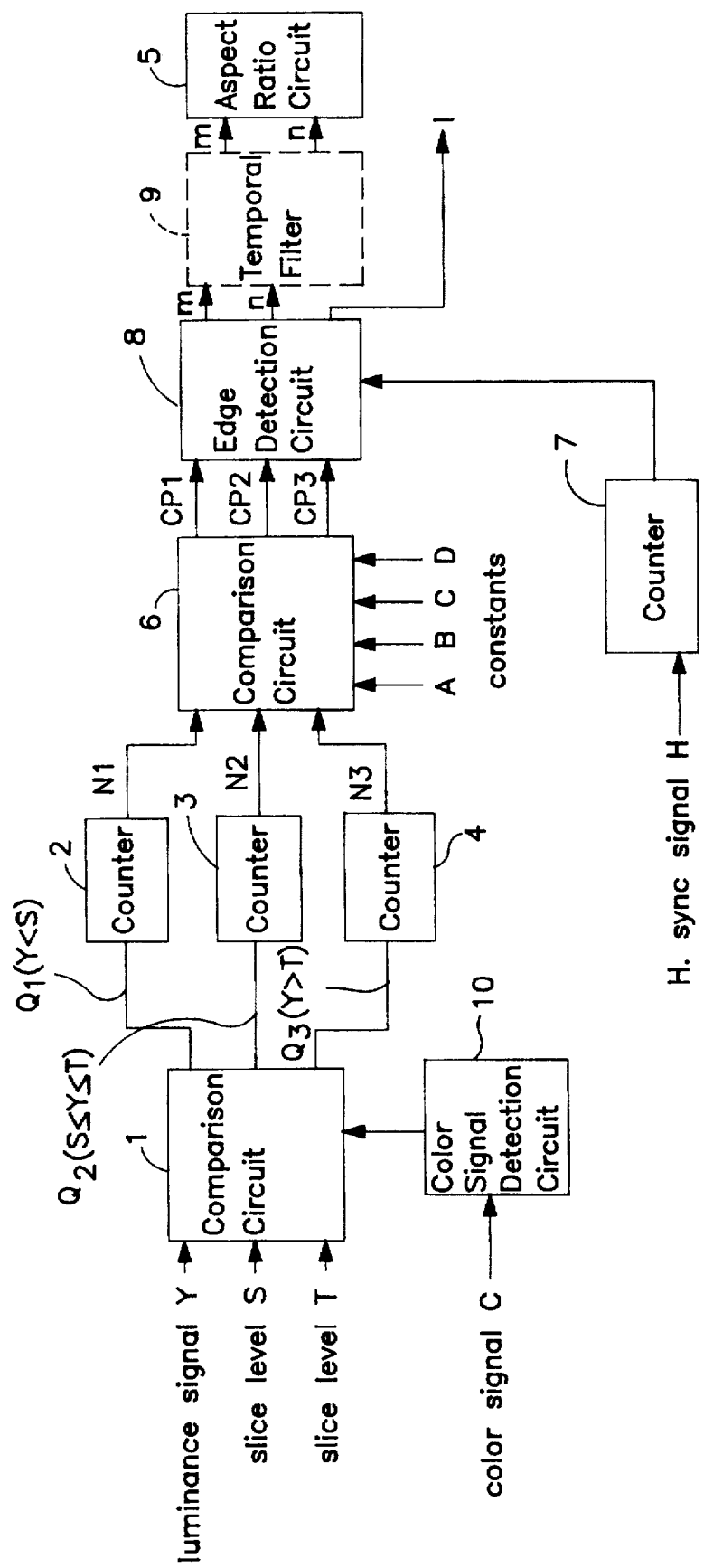
FIG. 8 is a block diagram of an automatic aspect ratio discrimination apparatus in accordance with a second exemplary embodiment of the present invention.

A block diagram of an automatic aspect ratio discrimination apparatus in accordance with a second exemplary embodiment of the present invention is shown in FIG. 8. The difference from the first exemplary embodiment is that a color signal detection circuit 10 is provided and its output is inputted to a comparison circuit 1, that is the performance when a color signal is detected.

When a color signal is detected at the color signal detection circuit 10, the comparison circuit 1 outputs a signal Q2 to a counter 3 regarding as the luminance level Y is between the slice levels S and T (S<=Y<=T), even if the luminance level Y is lower than the slice level S (Y<S) or higher than the slice level T (Y>T). When a color signal is not detected, the comparison circuit 1 performs similar to that of the first exemplary embodiment. Because Y<S means that the luminance signal is in the black range and Y>T means that the luminance signal is in the white range at the three distributions, Y<S, S<=Y<=T and Y>T.

When the upper and lower non-picture portions of a letter box signal are black and a subtitle is inserted in the non-picture portions, the subtitle is usually expressed wuth white. Therefore, when a color signal is detected, the signal is to be judged to be a picture and neither a non-picture portion nor a subtitle of the letter box signal.

At the automatic aspect ratio discrimination apparatus in accordance with the first exemplary embodiment, because the signal is judged to be black (non-picture portion) when a signal Q1 (Y<S) is larger than a constant A and the signal is judged to be a subtitle when a signal Q2 (S<=Y<=T) is smaller than a constant C and a signal Q3 (Y<T) is larger than a constant D, the detection accuracy of the black histogram and the subtitle histogram detected at the comparison circuit 6 can be increased by counting in the histogram as S<=Y<=T portion (picture portion), even if the luminance level is smaller than the slice level S (Y<S) or larger than the slice level T (Y>T).

Thus, according to the second exemplary embodiment, the picture top position E, the picture bottom position F and the subtitle bottom position G of the letter box signal can be detected with higher accuracy.

(Third exemplary embodiment)

Figure 9:
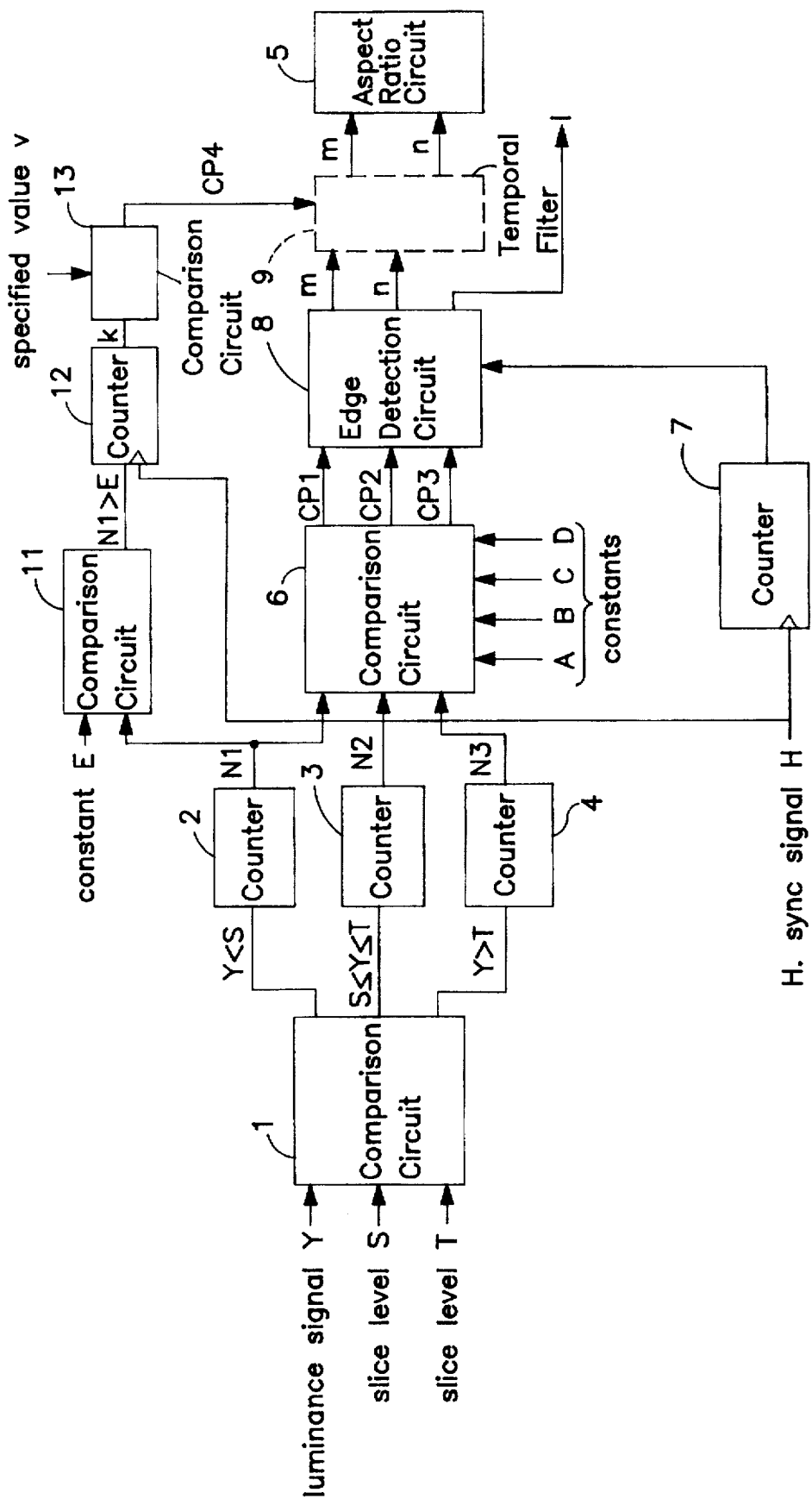
FIG. 9 is a block diagram of an automatic aspect ratio discrimination apparatus in accordance with a third exemplary embodiment of the present invention.

A block diagram of an automatic aspect ratio discrimination apparatus in accordance with a third exemplary embodiment of the present invention is shown in FIG. 9. The third exemplary embodiment aims to prevent detecting a fault picture top position and a fault picture bottom position by detecting the darkness of the entire video signal. The difference from the first exemplary embodiment is that a comparison circuit 11 for comparing an output of a counter 2 and a constant E, a counter 12 inputting an output of the comparison circuit 11 and a comparison circuit 13 for comparing an output of the counter 12 and a specified value V are provided and performance when the output CP4 of the comparison circuit 13 becomes a level H.

Comparing the output N1 of the counter 2 and the constant R at the comparison circuit 11, a level H is outputted if N1 is larger than R (N1>R) and a level L is outputted if N1 is not larger than R (N1<=R). This means comparison between the constant R and the state of Y<S of three histograms and a level H is outputted when N1>R and the line is judged to be dark. As for the constant R, in the case which the total number of sampled points during a line is 256, for example 200 is adopted.

The output of the comparison circuit 11 is counted at the counter 12 with clock input of a horizontal sync signal. An accumulated value k of the counter 12 indicates how many lines in a field is judged to be dark. The accumulated value k of the counter 12 and a specified value v are compared at a comparison circuit 13. If k is larger than v, the output CP4 of the comparison circuit 13 becomes a level H and if k is not larger than v, the output CP4 becomes a level L.

The specified value v is a value to determine to judge that when more than how many lines in a field are judged to be dark, the entire video signal in the field is judged to be dark. For example, a value 128 is inputted to the comparison circuit 13 as the specified value.

When the output of the comparison circuit 13 is in a level H, the temporal filter 9 outputs the values M and N again outputted just before, independent of the output of the edge detection circuit 9.

When the output of the comparison circuit 13 is in a level L, the temporal filter 9 performs similarly to that of the first exemplary embodiment. This is a countermeasure against the fact that when the entire video signal in a field is dark, there is high possibility to detect a fault picture top position m and a fault picture bottom position n.

Figure 10:
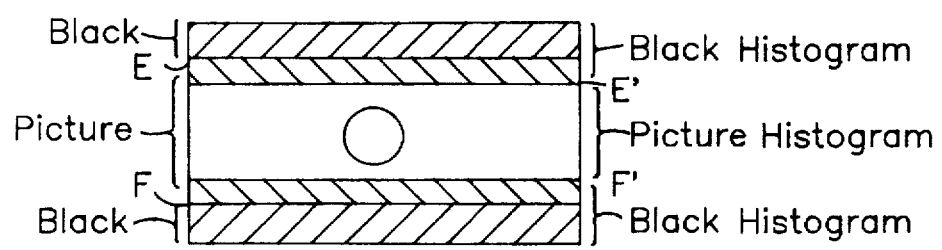
FIG. 10 illustrates a picture for explaining performance of the third and a fourth exemplary embodiment of the present invention.

According to the above-mentioned performance, it is prevented to detect a fault picture top poition E' and a fault picture bottom poition F' when the picture portion of the letter box signal is dark as shown in FIG. 10 and the signal M indicating an accurate picture top position detected before and the signal N indicating an accurate picture bottom position detected before are held at the temporal filter 9 and then outputted.

Thus, according to the third exemplary embodiment, at the automatic aspect ratio discrimination apparatus, a fault detection when the entire video signal is dark can be prevented.

Although the third exemplary embodiment was explained based on the first exemplary embodiment, it is obvious to be able to apply to the second exemplary embodiment.

(Fourth exemplary embodiment)

The fourth exemplary embodiment also aims to prevent detecting a fault picture top position and a fault picture bottom position by detecting the darkness of the entire video signal, similarly to that of the third exemplary embodiment.

Figure 11:
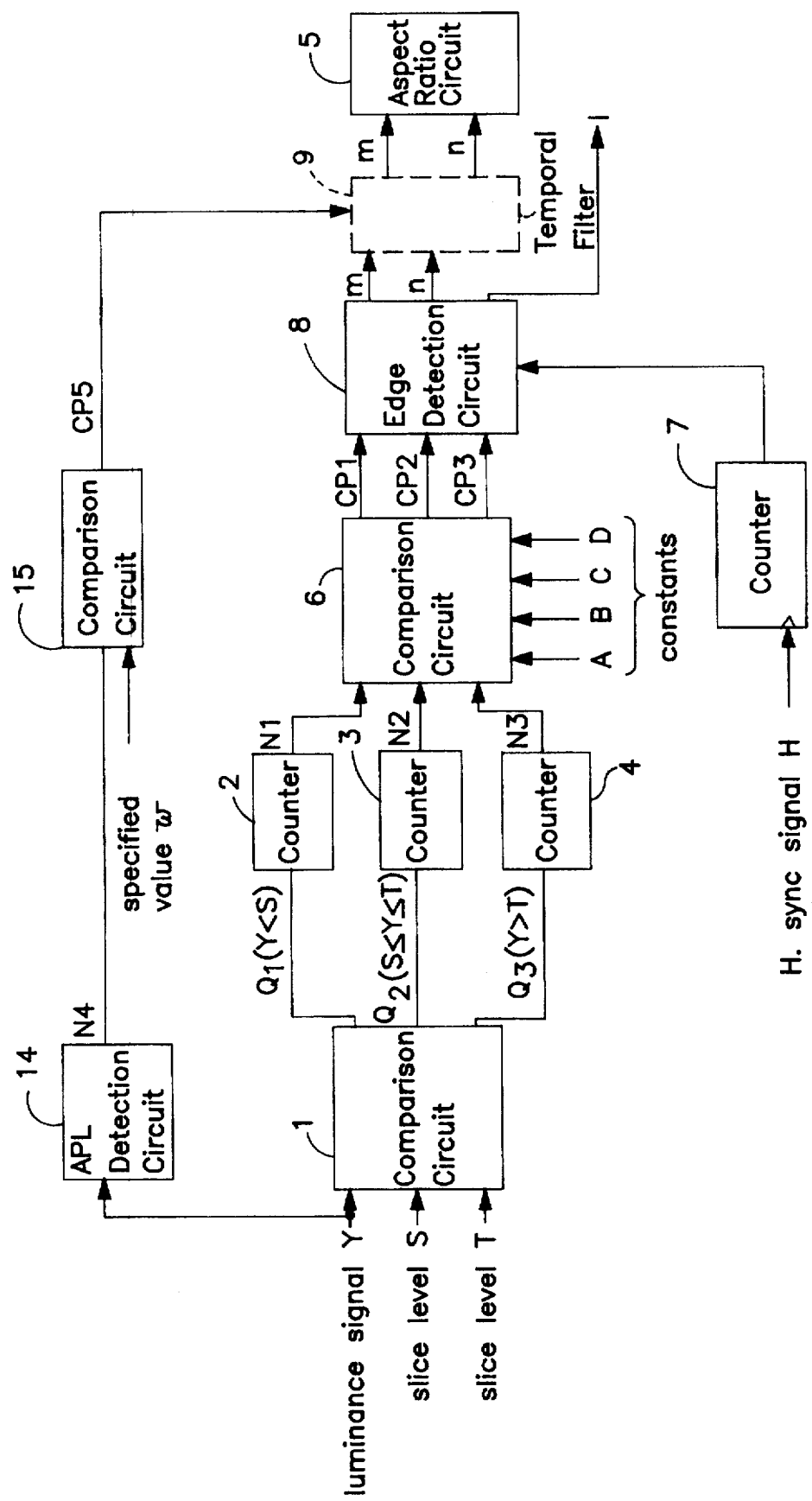
FIG. 11 is a block diagram of an automatic aspect ratio discrimination apparatus in accordance with the fourth exemplary embodiment of the present invention.

A block diagram of an automatic aspect ratio discrimination apparatus in accordance with a fourth exemplary embodiment of the present invention is shown in FIG. 11. The difference from the first exemplary embodiment is that an APL detection circuit 14 for detecting an average brightness level of the entire video signal during a field period, inputting a luminance signal Y and a comparison circuit 15 for comparing an output N4 of the APL detection circuit 14 and a specified value w are provided and the performance when the output CP5 of the comparison circuit 15 becomes a level H.

An average brightness level of a video signal during a field period is detected at the APL detection circuit 14. An output N4 of the APL detection circuit 14 and a specified value w are compared at the comparison circuit 15. When N4 is smaller than w, the output CP5 of the comparison circuit 15 becomes a level H and when N4 is not smaller than w, the output CP5 becomes a level L. That is, when the average brightness level N4 of a video signal during a field period is smaller than the specified value w, the entire video signal is judged to be dark and the output CP5 of the comparison circuit 15 becomes a level H. When the average brightness level N4 is not smaller than the specified value w, the entire video signal is judged to be bright and the output CP5 of the comparison circuit 15 becomes a level L. When the output N4 of the APL detection circuit 14 is outputted with 8 bits, for example a value 100 is inputted as the specified value w.

When the output of the comparison circuit 15 is a level H, the temporal filter 9 outputs again the values indicating a picture top position E and a picture bottom position F (shown in FIG. 10) outputted just before, independent of the output of the edge detection circuit 8.

When the output of the comparison circuit 15 is a level L, the temporal filter 9 performs similarly to that of the first exemplary embodiment.

This is a countermeasure against the fact that when the entire video signal during a field period is dark, there is high possibility to detect a fault picture top position E' and a fault picture bottom position F' (shown in FIG. 10).

According to the above-mentioned performance, it is prevented to detect a fault picture top poition E' and a fault picture bottom poition F' when the picture portion of the letter box signal is dark as shown in FIG. 10 and an accurate picture top position E and an accurate picture bottom position F detected before are held at the temporal filter 9 and then outputted.

Thus, according to the fourth exemplary embodiment, it is possible to prevent a fault detection of an automatic aspect ratio detection apparatus when the entire video signal is dark. The difference from the third exemplary embodiment is that it features how to detect the darkness of the entire video signal.

Although the fourth exemplary embodiment was explained based on the first exemplary embodiment, it is obvious to be able to apply to the second exemplary embodiment.

(Fifth exemplary embodiment)

The fifth exemplary embodiment aims to prevent detecting a fault picture top position and a fault picture bottom position by assuming each existence range for a picture top position, a picture bottom position and a subtitle bottom position.

Figure 12:
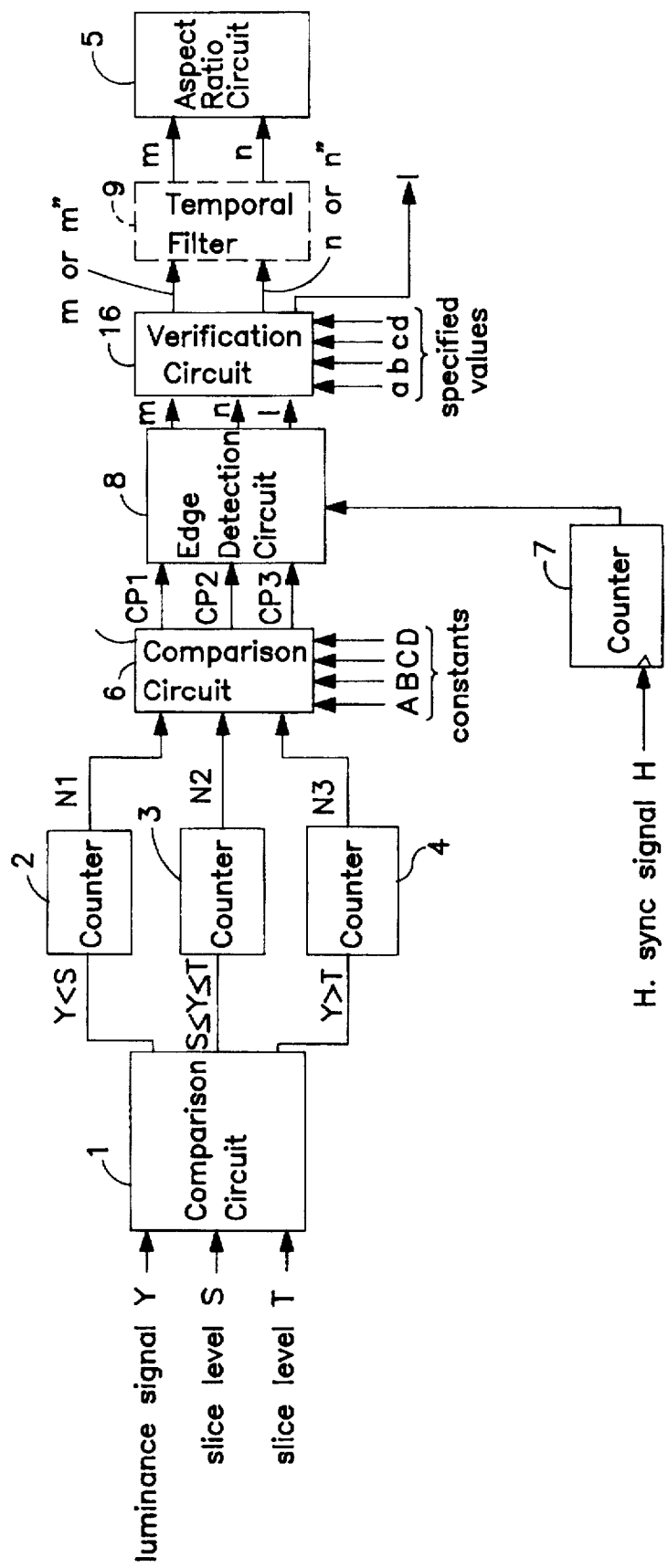
FIG. 12 is a block diagram of an automatic aspect ratio discrimination apparatus in accordance with a fifth exemplary embodiment of the present invention.

A block diagram of an automatic aspect ratio discrimination apparatus in accordance with a fifth exemplary embodiment of the present invention is shown in FIG. 12. The difference from the first exemplary embodiment is that a verification circuit 16 inputting the outputs m, n and l of an edge detection circuit 8 and specified values a, b, c and d and the performance when the input signals m, n and l differ from the outputs m", n" and L, respectively at the verification circuit 16.

The verification circuit 16 inputs the outputs m, n and l of the edge detection circuit 8 and when the edge m and n are detected at plural times (for example, m1 and m2, n1 and n2, respectively) during one field, the values m" and n" detected just before are outputted again. This is a phenomenon occurs against a signal such as a letter box signal having black bands similarly to upper and lower non-picture portions in the picture portion.

Figure 13A:
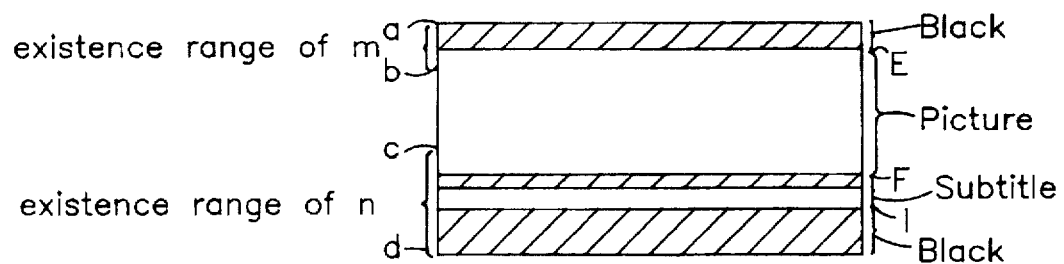
FIG. 13(a) illustrates a picture showing existence ranges of a picture starting position m and a picture ending position n.
Figure 13B:
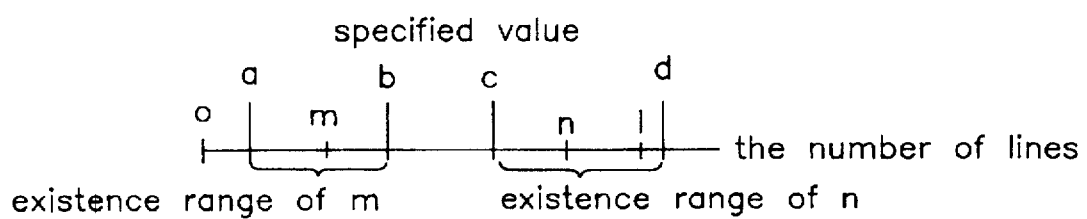
FIG. 13(b) illustrates a picture showing a relation between specified values a, b, c and d and each boundary positions m, n and l.

An existence ranges of m and n are determined by specified values a, b and c, d, respectively as shown in FIGS. 13(a)–(b) and when either a<m<b or c<n<d is fullfiled, the values m" and n" detected just before are outputted again. Assuming an ordinary picture display range is from 32-th line to 252-th line of the entire video range of 262.5 scanning lines, the specified values a, b, c and d take values 32, 132, 133 and 252, respectively.

As for the relation among the values m, n and l, because m<n<l is fulfilled when the correct edges are detected, the values m", n" and l detected just before are outputted again in the other cases. When all three restrictions described above are fullfiled, the values m, n and l are outputted as m", n" and l as they are, respectively. The temporal filter 9 performs similarly to that of the first exemplary embodiment.

Figure 14A:
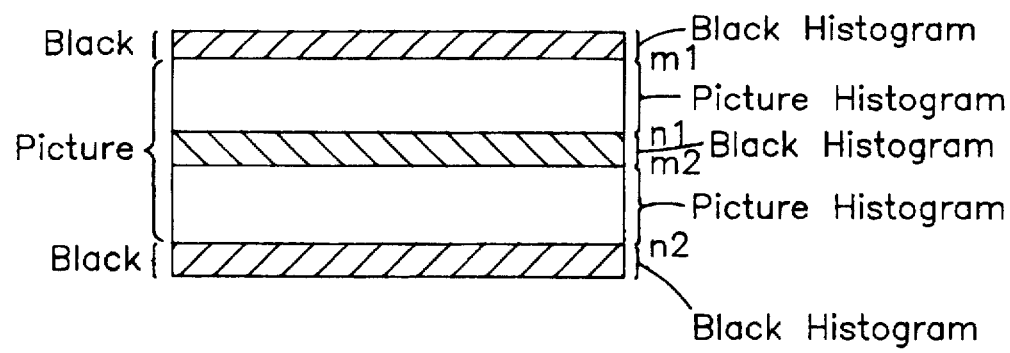
FIG. 14(a) illustrates a picture for explaining an example detecting plural picture starting positions m and plural picture ending positions n.
Figure 14B:
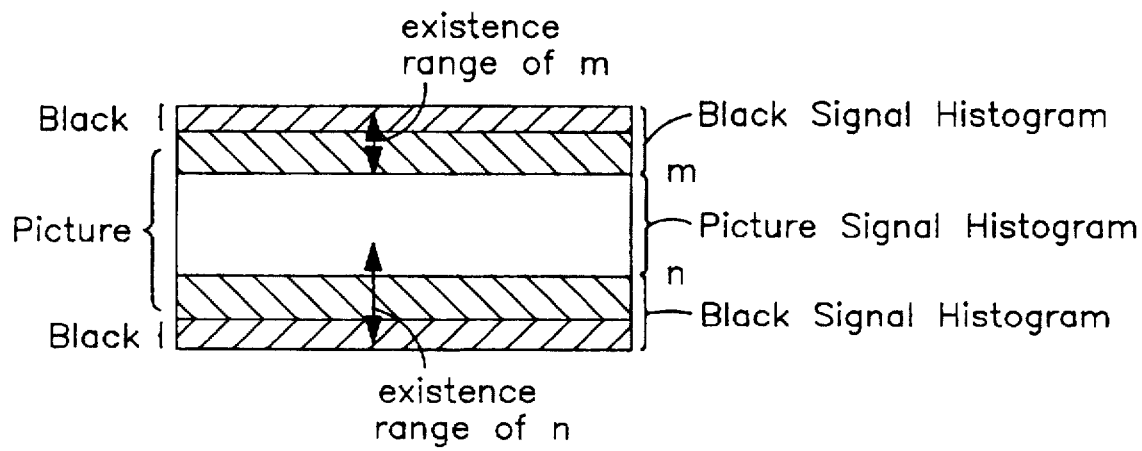
FIG. 14(b) illustrates a picture for explaining an example in the case in which the picture starting position m is out of the existence range.

According to the above-mentioned performance, it is prevented to detect a fault picture top poition E' and a fault picture bottom poition F' and it is possible to reduce a fault performance and to improve the reliability of the automatic aspect ratio discrimination apparatus for a letter box signal shown in FIGS. 14(a)–(b).

Although the fifth exemplary embodiment was explained based on the first exemplary embodiment, it is obvious to be able to apply to the second, third or fourth exemplary embodiments.

(Sixth exemplary embodiment)

The sixth exemplary embodiment aims to successively detect correct top and bottom positions of a picture portion for a letter box signal.

Figure 15:
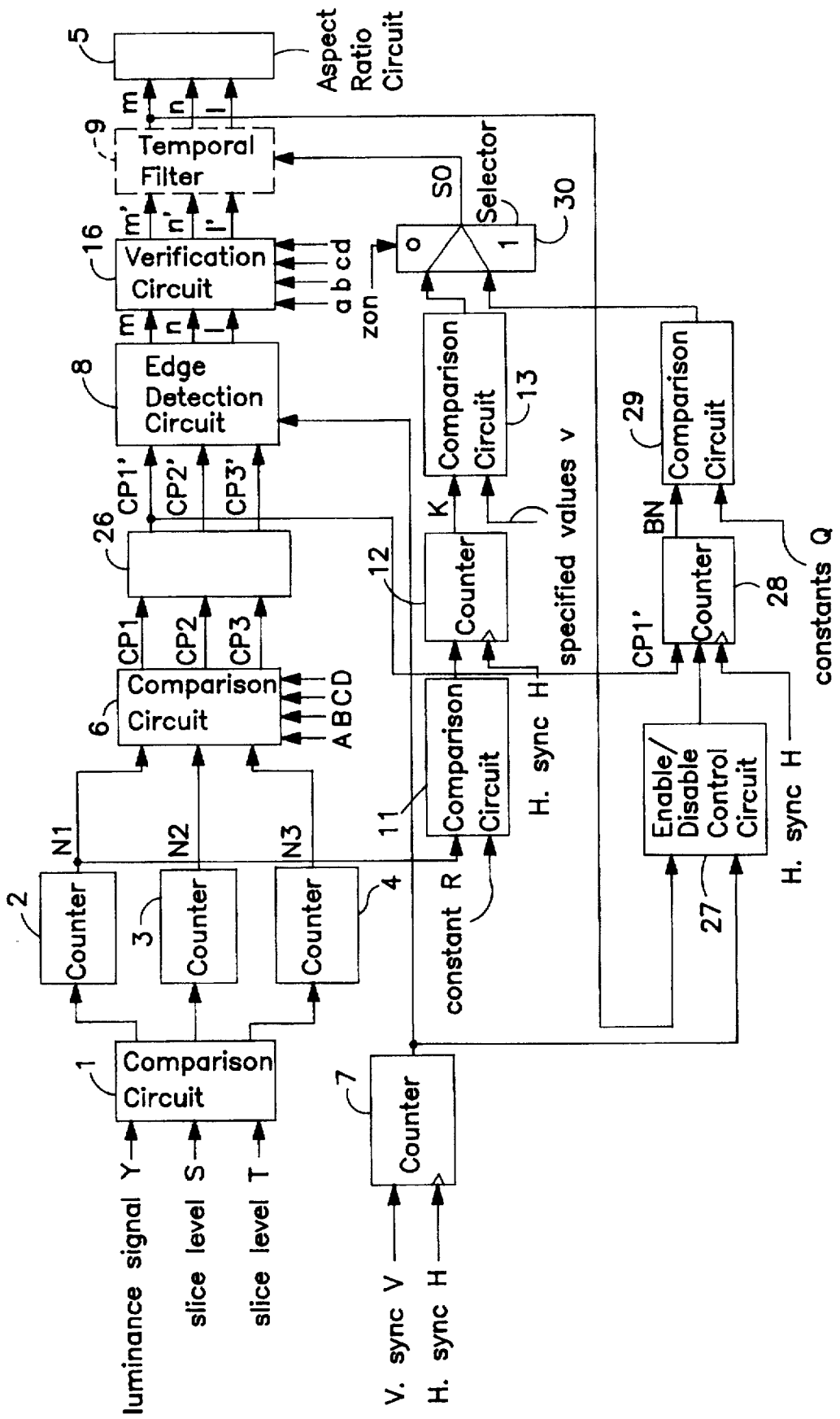
FIG. 15 is block diagram of an automatic aspect ratio discrimination apparatus in accordance with a sixth exemplary embodiment of the present invention.

A block diagram of an automatic aspect ratio discrimination apparatus in accordance with a sixth exemplary embodiment of the present invention is shown in FIG. 15. The difference from the first to fifth exemplary embodiments is that a vertical filter 26 for removing particilar points, an enable/disable control circuit 27 and a selector 30 are provided and the outputs of comparison circuits 13 and 29 are controlled by an external signal at the selector 30.

Figure 16:
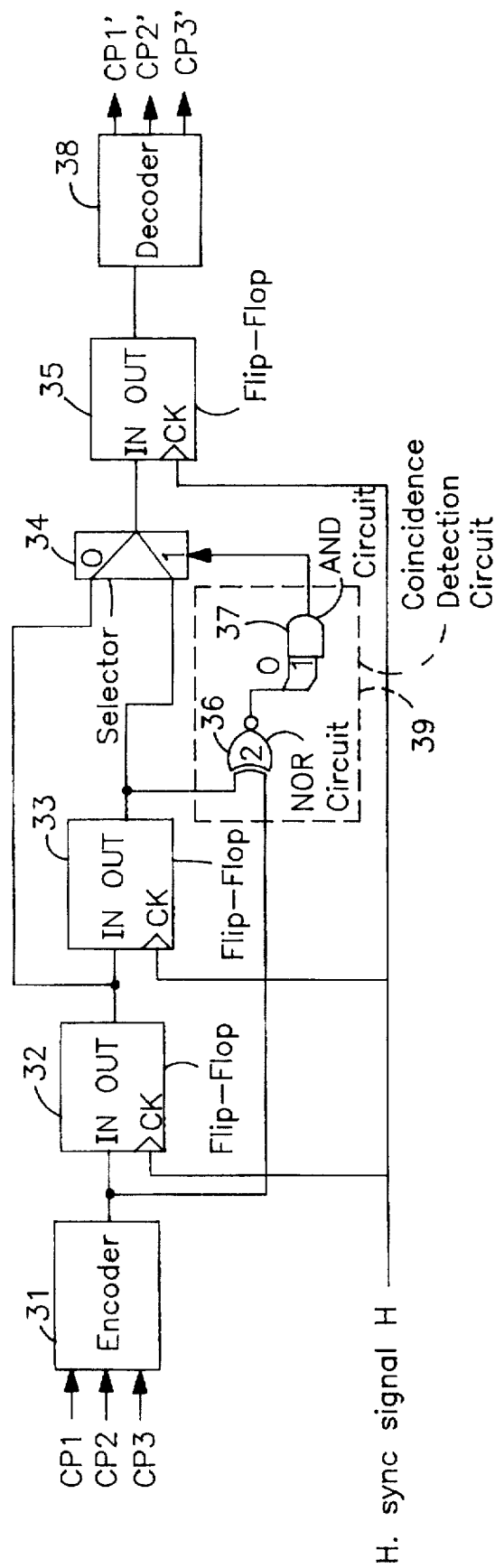
FIG. 16 is a block diagram of a vertical filter used in an automatic aspect ratio discrimination apparatus in accordance with the sixth exemplary embodiment of the present invention.

A block diagram of the vertical filter 26 used in the sixth exemplary embodiment of the present invention is shown in FIG. 16. The vertical filter 26 is used for removing particular points during a line period. Histograms are made at every line for a video signal at the comparison circuit 6, which the line is a black, a picture or a subtitle is judged for each line. According to the judgement, CP1, CP2 and CP3 are outputted and they are inputted to the vertical filter 26. Because these are inputted with 3 bits, they are encoded with 2 bits at an encoder 31 to make the postprocessing easy. An example of the encoding is shown as a table in FIG. 17.

Figures 17, 18:
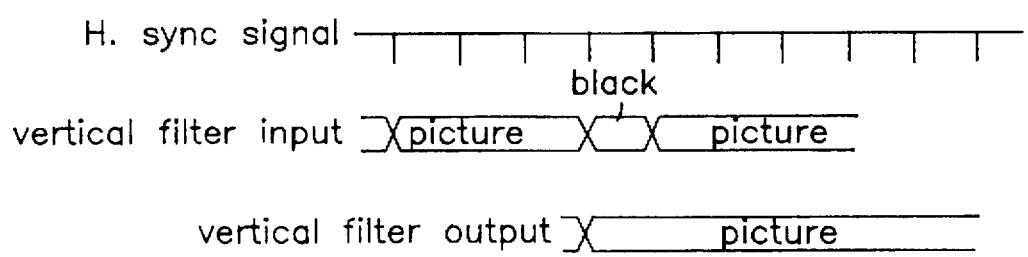
FIG. 17 is a table showing a code of an encoder used in an automatic aspect ratio discrimination apparatus in accordance with the sixth exemplary embodiment of the present invention.
FIG. 18 is timing diagrams which relate to a temporal filter used in an automatic ratio discrimination apparatus in accordance with the sixth exemplary embodiment of the present invention.

After encoding, the present data (the output of an encoder 31) and the data two lines ahead (the output of a flip-flop 33) are compared at every bit at an EX-NOR circuit 39 (comprising logic elements 36 and 37). If they are coincident, the two lines ahead data (the output of the flip-flop 33) is outputted and if they are not coincident, the data one line ahead (the output of a flip-flop 32) is outputted as it is. The output of the selector 34 is latched at a flip-flop 35, the signal is restored to an original three bit data at an decoder 38 and is outputted. A timing chart of the vertical filter 26 is shown in FIG. 18. The vertical filter 26 is used for removing the particular points when the particular points during one line period are generated and for obtaining smooth data, like a timing chart shown in FIG. 18.

An enable/disable control circuit 27 inputs the output of the counter 7 counting from zero in order and the output M (the picture top position E) of the temporal filter 9 and outputs a level H while the output of the counter 7 varies from zero to M and outputs a level L in the other cases. While the output of the enable/disable control circuit 27 is a level H, the counter 28 becomes enable and counts how many times the output CP1' of the vertical filter 26 becomes a level H during that period. What the output CP1' is a level H means that the line is judged to be black and it is found that how many lines were judged to be black on a non-picture portion of a letter box signal by counting the number of black lines until the output of the counter 7 becomes from zero to m".

The comparison circuit 29 compares the output BN of the counter 28 (the number of lines judged to be black at the non-picture portions) and a constant Q. The output becomes a level H when the output BN of the counter 28 is larger than the constanr Q (BN>Q) and becomes a level L when BN is not larger than Q (BN<=Q). Assuming the constant is, for example 3, when there are lines judged to be black for more than four lines in the non-picture portions of a letter box signal, the output of the comparison circuit 29 becomes a level L.

For example, the outputs of the comparison circuits 13 and 29 are controlled by an external signal zon outputted from a micro computer. The output of the comparison circuit 13 is inputted to the temporal filter 9 when the external signal zon is a level L and the output of the comparison circuit 29 is inputted to the temporal filter 9 when the external signal zon is a level H. When the output SO of the selector 30 is a level H, the temporal filter 9 outputs the values m" and n" outputted again just before, independent of the output of the verification circuit 16.

When the output of the selector 30 is a level L, the temporal filter 9 performs similarly to that of the first exemplary embodiment. However, as for the signal l detecting a subtitle, the temporal filter 9 outputs l as it is when same values are inputted as l' during a period longer than a specified time and holds the value previously detected in the other cases, independent of the output SO of the selector 30.

In the case of a signal with a 4:3 aspect ratio, by controlling the external control signal zon to a level L, the darkness of the entire video signal during a field period is detected and the picture top and bottom positions previously detected are held when the entire video signal is dark and a correct detected value is outputted when the entire video signal is bright. In the case of a letter box signal, by controlling the external control signal zon to a level H, only the darkness of the upper non-picture portion is detected and the picture top and bottom portions previously detected can be held. Thus, a stable detection information can be outputted for each video signal.

(Seventh exemplary embodiment)

The seventh exemplary embodiment aims to successively detect correct top and bottom positions of a picture for a letter box signal similarly to the sixth exemplary embodiment.

Figure 19:
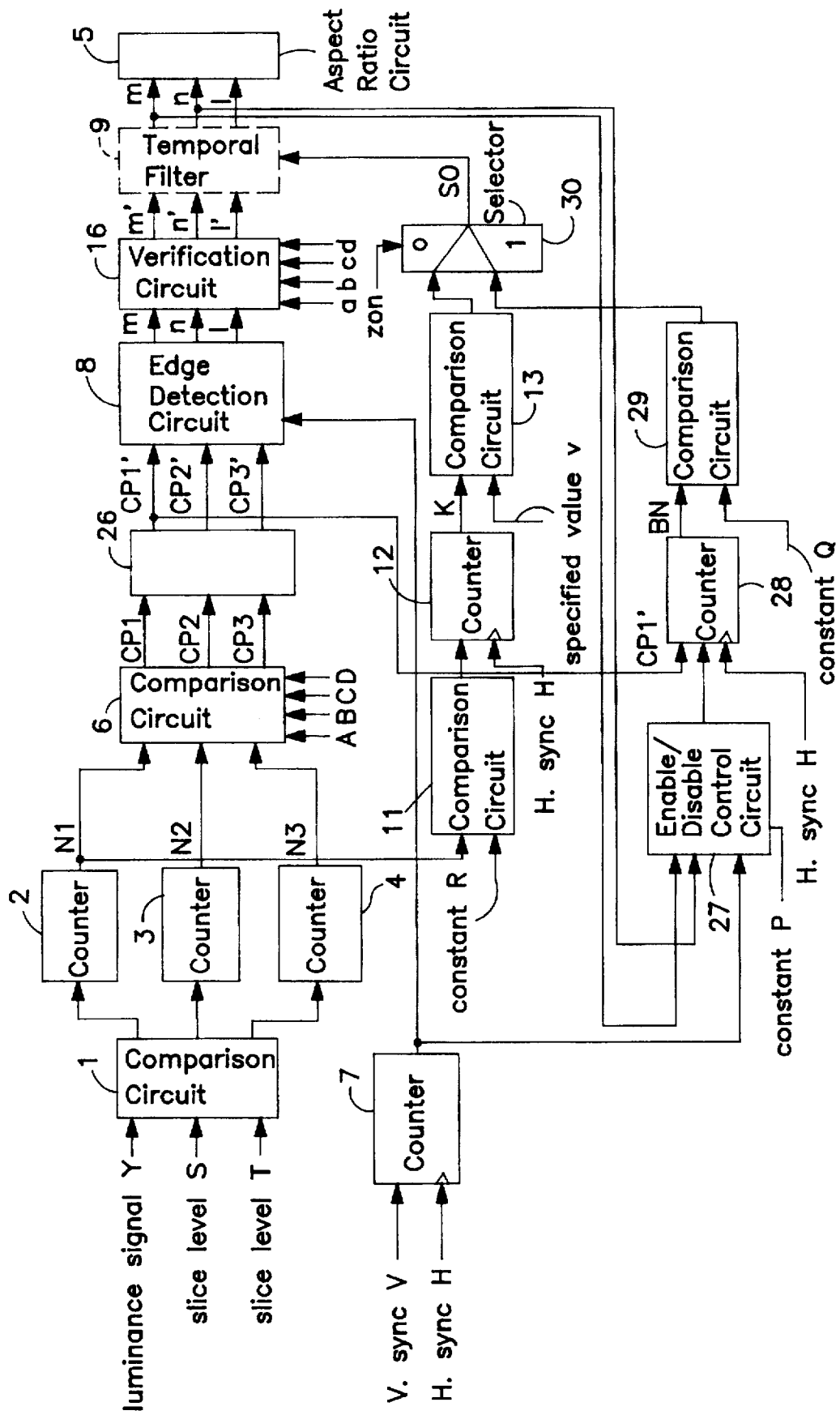
FIG. 19 is a block diagram of an automatic aspect ratio discrimination apparatus in accordance with a seventh exemplary embodiment of the present invention.

A block diagram of an automatic aspect ratio discrimination apparatus in accordance with a seventh exemplary embodiment of the present invention is shown in FIG. 19. The difference from the sixth exemplary embodiments is the method and the performance of an enable/disable control circuit 27.

An enable/disable control circuit 27 inputs an output of the counter 7 counting from zero in order and outputs M (indicating the picture top position E) and N (indicating the picture bottom position F) of the temporal filter 9 and outputs a level H while the output of the counter 7 varies from M to M+P and from N−P to N and outputs a level L in the other cases. While the output of the enable/disable control circuit 27 is a level H, a counter 28 becomes enable and counts how many times the output CP1' of the vertical filter 26 becomes a level H during that period.

The comparison circuit 29 compares an output BN of the counter 28 and a constant Q. The output becomes a level H when BN>Q and becomes a level L when BN is not larger than Q (BN<=Q). Assuming the constants P and Q as, for example 10 and 0, respectively, if there are lines judged to be black during periods between the picture top position and the 10-th line of a letter box signal and between the position 10 lines ahead of the picture bottom position and the picture bottom position is detected by counting at the counter 28 and the output of the comparison circuit 29 becomes a level H when there is at least one line judged to be black.

Thus, a fault detection of the picture top and bottom positions for a letter box signal which only the inside of the boundaries is dark by detecting the darkness inside the detected boundaries in the case of a letter box signal decreases and the detection accuracy increases.

(Eighth exemplary embodiment)

Figure 20:
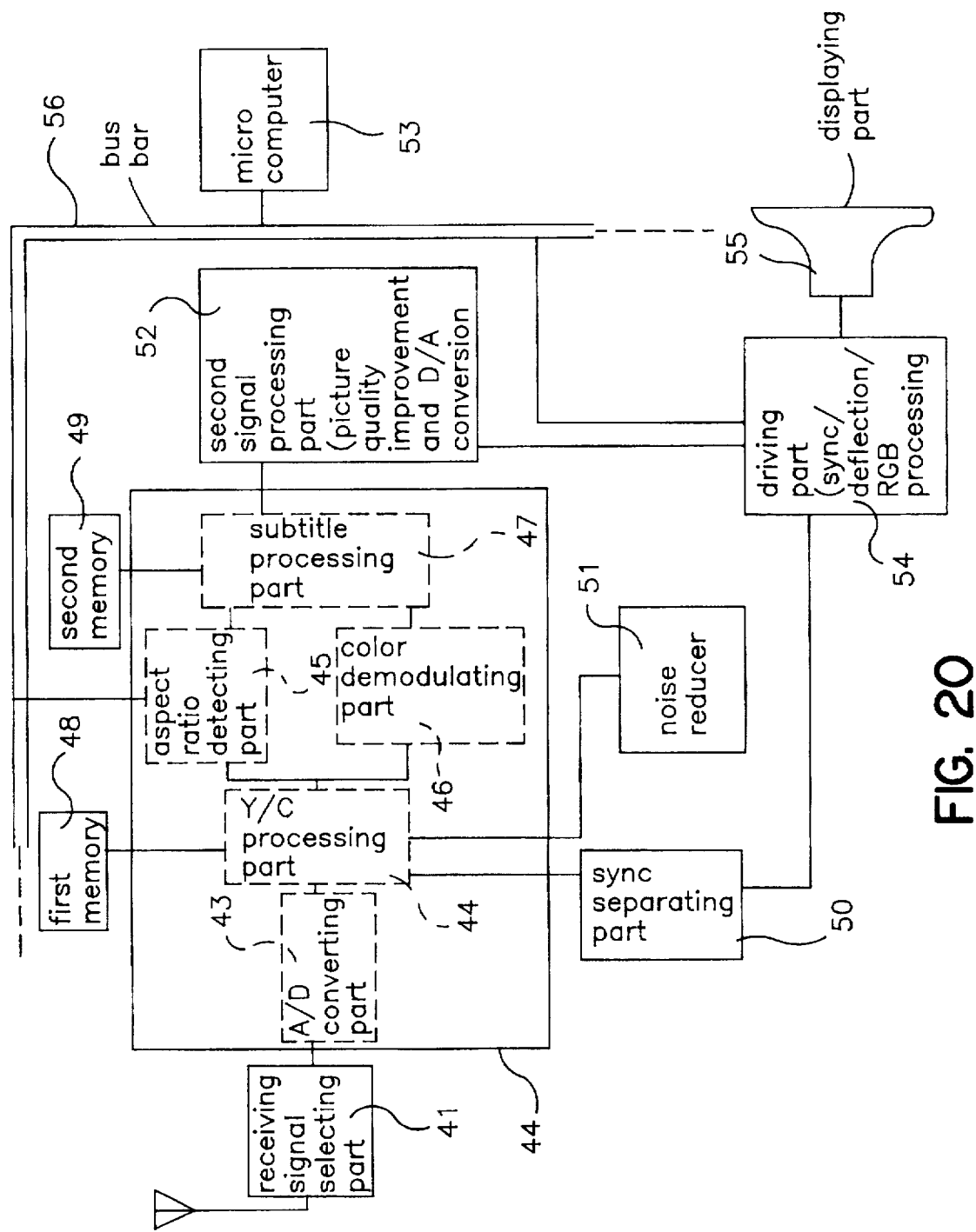
FIG. 20 is a block diagram of a television receiver in accordance with a eighth exemplary embodiment of the present invention.

An eighth exemplary embodiment relates to a television receiver assembled with an automatic aspect ratio discrimination apparatus and FIG. 20 shows a block diagram of the receiver.

A signal received at a receiving antenna is selected at a receiving signal selecting part 41 and is inputted to a first signal processing part 42 as an input analog video signal. The first signal processing part 42 includes an A/D converting part 43 for converting an input analog signal into a digital signal; a Y/C processing part 44 for processing the digital signal such as a three dimensional luminance and chrominance signal separation using a first memory 48; an aspect ratio detecting part 45 having automatic aspect ratio discrimination function to automatically detect an aspect ratio of the input video signal from the luminance signal; a demodulating part 46 for color signals; and a subtitle processing part 47 for processing a subtitle signal using a second memory 49.

The signal output of the first signal processing part 42 drives a displaying part 55 such as a CRT by a driving part 54 through the second signal processing part 52 having functions of picture quality improvement and D/A conversion. A sync signal is separated by an output from the Y/C processing part 44 of the first signal processing part 42 at a sync separating part 50 and is supplied to a driving part 54. A micro computer 53 controls each block mentioned above by inputted and outputted signals through a bus bar 56. As for a micro computer control system, only a part concerning to the automatic aspect ratio discrimination appratus is drawn in the drawing and the other part is omitted to prevent complexity.

Figure 1:
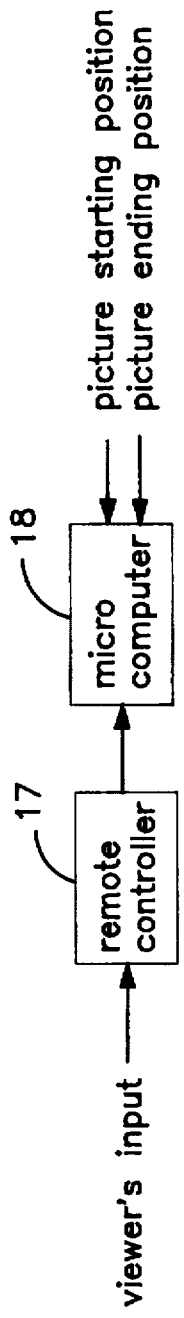
FIG. 1 is a block diagram of an automatic aspect ratio discrimination apparatus in accordance with the prior art.
Figure 2A:
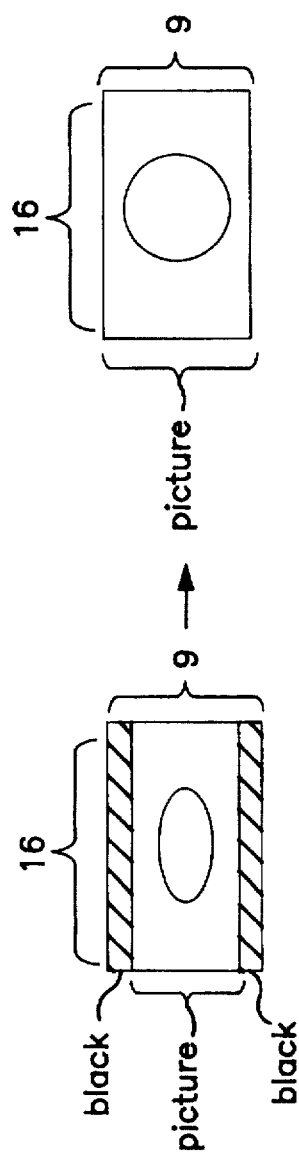
FIG. 2(a) illustrates displayed pictures for a video signal with a cinema format having a 5:3 aspect ratio.
Figure 2B:
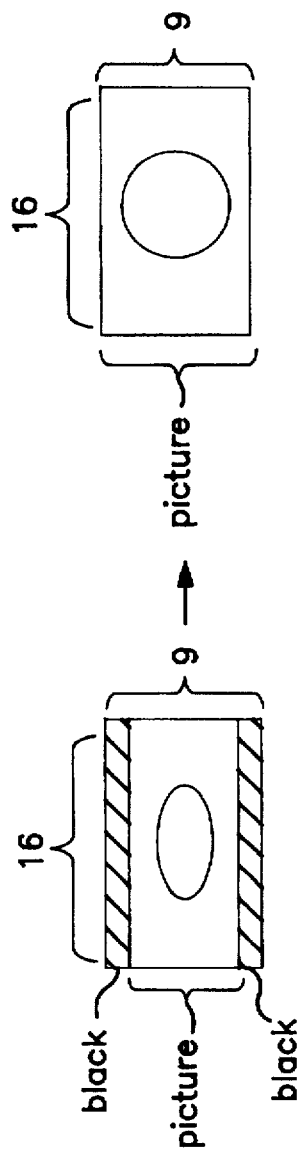
FIG. 2(b) illustrates displayed pictures for a video signal with a wide format of a 16:9 aspect ratio.
Figure 21A:
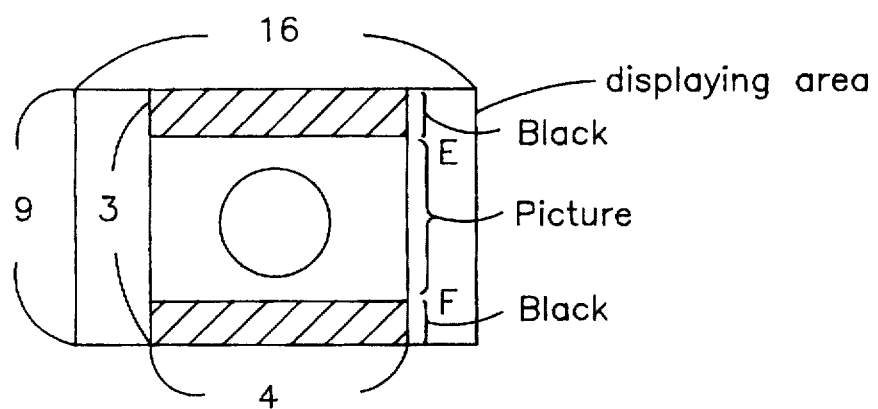
FIG. 21(a) illustrates a letter box picture displayed on a display device with a 16:9 aspect ratio in accordance with the eighth exemplary embodiment of the present invention.
Figure 21B:
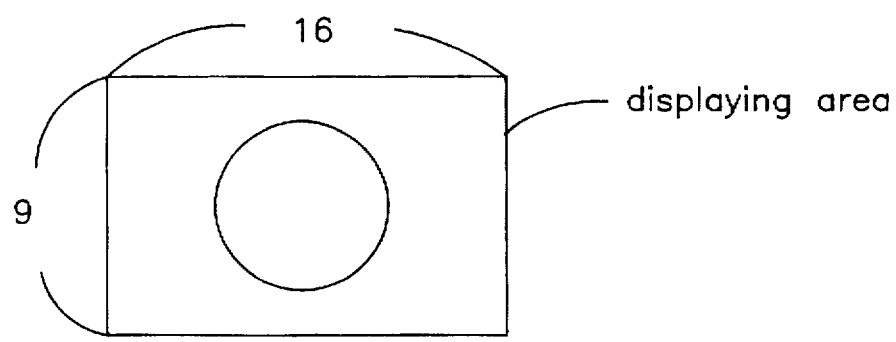
FIG. 21(b) illustrates an expanded picture of the pure picture part of the letter box picture in accordance with the eighth exemplary embodiment of the present invention.

Automatic aspect ratio discrimination and performance displaying an optimum picture using the discimnation result are explained below. FIG. 21(a) shows a picture displayed on the displaying part 55 having a screen with a 16:9 aspect ratio without any processing about an aspect ratio when the input video signal is a letter box signal with a 16:9 aspect ratio. The displaying part 55 has a so-called wide screen with a 16:9 aspect ratio as a displaying area as shown in the drawing and a letter box picture displayed by a video signal with a 4:3 aspect ratio is displayed on the screen. There is another display mode to display a picture fully scanned in the displaying area as shown in FIG. 2(b) left.

Performance of the television receiver assembled with an automatic aspect ratio discrimination apparatus described above is explained below. A luminance signal which is one of the outputs of the Y/C processing part 44 of the first signal processing part 42 is inputted to the aspect ratio detecting part 45. The aspect ratio detecting part 45 has a function of an automatic aspect ratio discrimination apparatus, samples brightness levels of the inputted luminance signal and generates a brightness histogram at every scanning line. The video kind is discriminated from the shape of the histogram and the picture top position E and the picture bottom position F are detected as boundary points between different kinds of video signals as shown in FIG. 21(a). The picture top position E and the picture bottom position F are detected as a time from the vertical sync signal outputted from the Y/C processing part 44.

The above-mentioned detecting signal is inputted to the subtitle processing part 47 and is used as a subtitle processing signal when there is a subtitle in the black portion of the letter box picture and at the same time and the detecting signal is inputted to the micro computer 53 through the bus bar 56 and is inputted to the driving part 54 as a control signal from the micro computer 53. A deflection output signal and R, G and B output signals are outputted to drive the displaying part 55 from the driving part 54. In this case, magnified displaying is possible by changing the deflection amplitude according to the necessity.

In the amplitude expansion, a factor concerning to a vertical amplitude is determined using an output signal of the aspect ratio detecting part 45. That is, from the picture content of an input video signal and the aspect ratio of the displaying area of the displaying part 55, what display is an optimum display is programmed in the micro computer 53. Therefore, the horizontal amplitude is expanded to full of the displaying area by the control signal from the micro computer 53, because the input signal is a letter box signal. Then, a vertical position and an aspect ratio of the picture are calculated according to the information of the picture top position E and the picture bottom position F from the aspect ratio detecting part 45 and from the calculated result, a vertical position movement and a vertical amplitude magnifying factor are automatically calculated and an optimum deflection current is outputted.

As a result, the picture portion of the letter box signal is expanded to full of the displaying area of the displaying part 55 and a picture display which is optimum for the picture can be achieved. Thus, not only at a television receiver but at a display apparatus having a displaying part, an optimum picture display is automatically possible for any input video signal by assembling with an automatic aspect ratio discrimination apparatus providing a micro computer programmed so that it outputs a control signal which can display an optimum picture, from relation between the aspect ratio of the displaying area and the input video signal.

An apparatus for discriminating kinds of video signals and an automatic aspect ratio discrimination apparatus and a television receiver using it in accordance with the present invention detects an accurate picture top position, an accurate bottom position and an accurate subtitle position for the letter box signal having no aspect ratio discrimanation signal by using a histogram generation circuit (comparison circuit, counters), an edge detection circuit and a temporal filter. The practical effect is big when the aspect ratio conversion, vertical position movement and subtitle moving processing are automatically executed.

An automatic aspect ratio discrimination apparatus in accordance with the present invention can prevent detecting a fault picture top position and a fault picture bottom position of the letter box signal by using a combination of a comparison circuit and counters or a combination of an APL detection circuit and another comparison circuit for detecting the darkness of a video signal during a field period and its practical effect is big.

An automatic aspect ratio discrimination apparatus in accordance with the present invention can prevent detecting fault picture top and bottom positions by using a verification circuit specifying such as the existence range of the picture top and bottom positions of a letter box signal and its practical effect is big.

An automatic aspect ratio discrimination apparatus in accordance with the present invention can successively detect accurate picture top and bottom positions of a letter box signal by selecting a case in which the darkness of a video signal is judged for the entire video signal during one field period and a case in which the darkness of a video signal is judged for a specified period in one field by an external signal and its practical effect is big.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An apparatus for distinguishing between a plurality of video signal types comprising:
    (1) histogram generation means for detecting a plurality of luminance signal levels of an input video signal at a first predetermined time interval and for generating a plurality of histograms, each one of said plurality of histograms expressing a frequency distribution for each corresponding luminance signal level, wherein said frequency distribution corresponds to a rate of recurrence of the corresponding luminance signal level;
    (2) comparison means for classifying each of said histograms of said histogram generation means at a second predetermined time interval as one video signal type of said plurality of video signal types;
    (3) edge detection means for detecting a plurality of video signal type variations from an output of said comparison means;
    (4) counter means for generating a plurality of timing signals for specifying the locations of the video signal type variations detected at said edge detection means; and
    (5) temporal filter means for generating a position signal of the video signal when a time interval between variation detections by the edge detection means is equal to a third predetermined time interval; and
    wherein
    said plurality of video signal types of the input video signal are determined by using the output of said temporal filter means.

2. An automatic aspect ratio determination apparatus comprising:
    (1) histogram generation means for detecting a plurality of luminance signal levels of an input video signal at a first predetermined time interval and for generating a plurality of histograms, each one of said plurality of histograms expressing a frequency distribution for each corresponding luminance signal level;
    (2) comparison means for classifying each of said histograms of said histogram generation means at a second predetermined time interval as one video signal type of said plurality of video signal types;
    (3) edge detection means for detecting a plurality of video signal type variations from the output of said comparison means;
    (4) determining means for determining an aspect ratio of a picture portion of said input video signal from an output of said edge detection means and based on the output of said comparison means.

3. An automatic aspect ratio determination apparatus as recited in claim 2, comprising:
    counter means for generating a plurality of timing signals for specifying locations of the video signal type variations detected at said edge detection means;
    wherein
    said determining means also determines positioning of the video signal type variations of said input video signal, and
    the aspect ratio of the picture portion of said input video signal is also based on the plurality of timing signals of said counter means.

4. An automatic aspect ratio determination apparatus as recited in claim 3, comprising:
    temporal filter means for generating a position signal of the video signal when a time interval between variation detections by the edge detection means is equal to a third predetermined time interval;
    wherein
    the positioning of the video signal type variations of said input video signal is based on an output of said temporal filter means, and
    the aspect ratio of the picture portion of said input video signal is further based on the output of said temporal filter means.

5. An apparatus for distinguishing between a plurality of video signal types comprising:
    (1) histogram generation means for sampling a luminance signal level of the input video signal and for generating a plurality of histograms, each one of said plurality of histograms expressing a frequency distribution for each luminance signal level at every scanning line;
    (2) comparison means for ordering the histograms generated at said histogram generation means and for classifying each of said histograms as one video signal type of said plurality of video signal types;
    (3) edge detection means for detecting a plurality of variations of said input video signal from a video signal type with a different scanning line, from the output of said comparison means;
    (4) counter means for generating a plurality of timing signals to specify the locations on said input video signal corresponding to the plurality of variations detected at said edge detection means; and
    (5) temporal filter means for generating a position signal when a time interval between variation detections by the edge detection means is equal to a predetermined time interval; and
    wherein
    said plurality of video signal types of the input video signal are distinguished by using the output of said temporal filter means.

6. An automatic aspect ratio determination apparatus comprising:
  (1) histogram generation means for sampling a luminance signal level of the input video signal and for generating a plurality of histograms, each one of said plurality of histograms expressing a frequency distribution for each luminance signal level at every scanning line;
  (2) comparison means for ordering the histograms generated at said histogram generation means and for classifying each of said histograms as one video signal type of said plurality of video signal types;
  (3) edge detection means for detecting a plurality of variations of said input video signal from a video signal type with a different scanning line, from the output of said comparison means;
  (4) determining means for determining an aspect ratio of a picture portion of said input video signal based on outputs of said comparison means and said edge detection means.

7. An automatic aspect ratio determination apparatus as recited in claim 6, comprising:
  counter means for generating a plurality of timing signals for specifying locations of the video signal type variations detected at said edge detection means;
  wherein
  said determining means also determines positioning of the video signal type variations of said input video signal, and
  the aspect ratio of the picture portion of said input video signal is also based on the plurality of timing signals of said counter means.

8. An automatic aspect ratio determination apparatus as recited in claim 7, comprising:
  temporal filter means for generating a position signal of the video signal when a time interval between variation detections by the edge detection means is equal to a predetermined time interval;
  wherein
  the positioning of the video signal type variations of said input video signal is based on an output of said temporal filter means, and
  the aspect ratio of the picture portion of said input video signal is further based on the output of said temporal filter means.

9. An automatic aspect ratio determination apparatus as recited in claims 2, 3, 4, 6, 7 or 8, wherein
  said comparison means classifies the video signal type to be one of i) a black, ii) a picture and iii) a subtitle.

10. An automatic aspect ratio determination apparatus as recited in claim 9, wherein
  said edge detection means outputs
  i) a picture starting position when the video signal type varies from said black to said picture,
  ii) a picture ending position when the video signal type varies from said picture to said black, and
  iii) a subtitle ending position when the video signal type varies from said subtitle to said black.

11. An apparatus for distinguishing between a plurality of video signal types comprising:
  (1) first comparison means comprising means for:
    comparing a luminance signal Y and two slice levels S and T, respectively,
    outputting a first output which becomes a level H when said luminance signal Y is smaller than said slice level S (Y<S),
    outputting a second output which becomes said level H when said luminance signal Y is not smaller than said slice level S and said luminance signal Y is not larger than said slice level T (S<=Y<=T), and
    outputting a third output which becomes said level H when said luminance signal Y is larger than said slice level T (Y>T);
  (2) first, second and third counter means for counting said first, second and third outputs of said first comparison means, respectively, and outputting an output N1 of said first counter means, an output N2 of said second counter means and an output N3 of said third counter means;
  (3) second comparison means comprising means for:
    comparing the outputs N1, N2 and N3 of said first, second and third counter means, respectively and a plurality of predetermined constants A, B C and D and
    outputting a fourth output CP1 which becomes said level H when said first counter means output N1 is larger than said predetermined constant A (N1>A),
    outputting a fifth output CP3 which becomes said level H when said first counter means output N1 is larger than said predetermined constant B (N1>B), said second counter means output N2 is smaller than said predetermined constant C (N2<C) and said third counter means output N3 is larger than said predetermined constant D (N3>D), and
    outputting a sixth output CP2 which becomes said level H when said first counter means output N1 is an L level and said third counter means output N3 is said L level;
  (4) fourth counter means comprising means for:
    inputting a horizontal sync signal as a clock input, and counting the number of horizontal input pulses from zero;
  (5) edge detection means comprising means for:
    inputting the outputs CP1, CP2 and CP3 of said second comparison means, respectively and the output of said fourth counter means and
    outputting a seventh output m by detecting the value of said fourth counter means when the output of said second comparison means varies from CP1 to CP2,
    outputting an eighth output n by detecting the value of said fourth counter means when the output of said second comparison means varies from CP2 to CP1, and
    outputting a ninth output l by detecting the value of said fourth counter means when the output of said second comparison means varies from CP3 to CP1; and
  (6) temporal filter means comprising means for:
    inputting said seventh and said eighth outputs m and n of said edge detection means, respectively,
    outputting the input values m and n as first and second outputs, respectively, when the input values m and n are constant during a period longer than a predetermined time, and
    outputting the values m' and n' held in said temporal filter means as first and second outputs respectively, independent of the input values, in the other cases.

12. An automatic aspect ratio determination apparatus comprising:
  (1) first comparison means comprising means for:
    comparing a luminance signal Y and two slice levels S and T, respectively,
    outputting a first output which becomes a level H when said luminance signal Y is smaller than said slice level S (Y<S),
    outputting a second output which becomes said level H when said luminance signal Y is not smaller than said slice level S and said luminance signal Y is not larger than said slice level T (S<=Y<=T), and outputting a third output which becomes said level H when said luminance signal Y is larger than said slice level T (Y>T);

(2) first, second and third counter means for counting said first, second and third outputs of said first comparison means, respectively, and outputting an output N1 of said first counter means, an output N2 of said second counter means and an output N3 of said third counter means;

(3) second comparison means comprising means for:
comparing the outputs N1, N2 and N3 of said first, second and third counter means, respectively and a plurality of predetermined constants A, B, C and D and
outputting a fourth output CP1 which becomes said level H when said first counter means output N1 is larger than said predetermined constant A (N1>A),
outputting a fifth output CP3 which becomes said level H when said first counter means output N1 is larger than said predetermined constant B (N1>B), said second counter means output N2 is smaller than said predetermined constant C (N2<C) and said third counter means output N3 is larger than said predetermined constant D (N3>D), and
outputting a sixth output CP2 which becomes said level H when said first counter means output N1 is an L level and said third counter means output N3 is said L level;

(4) fourth counter means comprising means for:
inputting a horizontal sync signal as a clock input and counting the number of horizontal input pulses from zero;

(5) edge detection means comprising means for:
inputting the outputs CP1, CP2 and CP3 of said second comparison means, respectively and the output of said fourth counter means and
outputting a seventh output m by detecting the value of said fourth counter means when the output of said second comparison means varies from CP1 to CP2,
outputting an eighth output n by detecting the value of said fourth counter means when the output of said second comparison means varies from CP2 to CP1, and
outputting a ninth output l by detecting the value of said fourth counter means when the output of said second comparison means varies from CP3 to CP1;

(6) temporal filter means comprising means for:
inputting said seventh and said eighth outputs m and n of said edge detection means, respectively,
outputting the input values m and n as first and second outputs, respectively, when the input values m and n are constant during a period longer than a predetermined time, and
outputting the values m' and n' held in said temporal filter means as the first and second outputs, respectively, independent of the input values, in the other cases; and (7) means for determining an aspect ratio of a picture portion of an input video signal from the output of said temporal filter means.

13. An automatic aspect ratio determination apparatus as recited in claim 12, comprising:
color signal detection means for inputting a color signal and outputting said level H when said color signal is detected, and wherein
said first comparison means outputs said second output which is said level H when the luminance signal Y is not smaller than the slice level S and not larger than the slice level T (S<=Y<=T), when said color signal is detected at said color signal detection means.

14. An automatic aspect ratio determination apparatus as recited in claim 12, comprising:
(1) third comparison means for inputting the output N1 of said first counter means and a predetermined constant E and for outputting said level H when N1 is larger than E (N1>E);
(2) fifth counter means for inputting the output of said third comparison means and a horizontal sync signal as a clock input;
(3) fourth comparison means for inputting the output k of said fifth counter means and a specified value v and for outputting said level H when k is larger than v (k>v);
(4) said temporal filter means for
inputting said seventh and said eighth outputs m and n of said edge detection means and the output CP4 of said fourth comparison means, respectively,
outputting the input values m and n, respectively, when CP4 is said level H and the input values m and n are constant for a period longer than a specified period and
outputting the values m and n held in said temporal filter means as first and second outputs, respectively, independent of the input values in the other cases.

15. An automatic aspect ratio determination apparatus as recited in claim 12, comprising:
(1) APL detection means for inputting said luminance signal Y, detecting a brightness level of the input video signal during a field period and outputting a value N4;
(2) third comparison means comprising means for:
inputting the output N4 of said APL detection means and a specified value w and
outputting said level H when said output N4 is smaller than said specified value w; and
(3) said temporal filter means comprising means for:
inputting said seventh and said eighth outputs m and n of said edge detection means and the output CP5 of said third comparison means, respectively,
outputting the inputted values m and n when said third comparison means output CP5 is said level H and the input values m and n are constant during a period longer than a specified period, and
outputting the values m and n held in said temporal filter means as first and second outputs, respectively, independent of the input values in the other cases.

16. An automatic aspect ratio determination apparatus as recited in claim 12, comprising:
(1) verification means comprising means for:
inputting said seventh, said eighth and said ninth outputs m, n and l of said edge detection means, respectively and a plurality of predetermined values a, b, c and d;
outputting the input values m, n and l, respectively, when m is larger than a and smaller than b (a<m<b), n is larger than c and smaller than d (c<n<d) and m is smaller than l and larger than n (l>m>n), and
outputting the previous values held at the verification means as first, second and third outputs, respectively, in the other cases; and
(2) said temporal filter means comprising means for:
inputting first and second outputs m" and n" of said verification means, respectively and
outputting the input values m" and n", respectively, when the input values m" and n" are constant during a period longer than a specified time, and
outputting the values m and n held in said temporal filter as first and second outputs, respectively, independent of the input values, in the other cases.

* * * * *